United States Patent
Champion

(10) Patent No.: US 7,799,418 B2
(45) Date of Patent: Sep. 21, 2010

(54) TRANSVERSE-DIRECTION, ELASTOMERIC, BREATHABLE FILM

(75) Inventor: William T. Champion, Tucson, AZ (US)

(73) Assignee: Pliant Corporation, Schaumburg, IL (US)

( * ) Notice: Subject to any disclaimer, the term of this patent is extended or adjusted under 35 U.S.C. 154(b) by 0 days.

(21) Appl. No.: 11/771,412

(22) Filed: Jun. 29, 2007

(65) Prior Publication Data

US 2007/0248835 A1    Oct. 25, 2007

Related U.S. Application Data

(63) Continuation of application No. 11/048,408, filed on Feb. 1, 2005, now abandoned.

(51) Int. Cl.
B32B 3/26 (2006.01)
B32B 5/22 (2006.01)
B32B 27/08 (2006.01)

(52) U.S. Cl. .......... 428/315.9; 428/317.9; 428/515; 428/516; 428/517

(58) Field of Classification Search ........... 428/317.9, 428/315.9, 500, 515–517
See application file for complete search history.

(56) References Cited

U.S. PATENT DOCUMENTS

| | | | |
|---|---|---|---|
| 4,677,017 A | | 6/1987 | DeAntonis et al. |
| 5,139,878 A | | 8/1992 | Kim et al. |
| 5,914,184 A | * | 6/1999 | Morman .......... 428/315.9 |
| 6,015,769 A | * | 1/2000 | Wang .......... 502/331 |
| 6,045,900 A | * | 4/2000 | Haffner et al. .......... 428/315.9 |
| 6,348,258 B1 | * | 2/2002 | Topolkaraev et al. .......... 428/317.9 |
| 6,517,950 B1 | * | 2/2003 | Patrick et al. .......... 428/516 |
| 6,638,636 B2 | * | 10/2003 | Tucker .......... 428/515 |
| 6,682,512 B2 | * | 1/2004 | Uitenbroek et al. .......... 604/385.16 |
| 6,682,803 B2 | * | 1/2004 | McCormack et al. .......... 428/138 |
| 6,702,800 B1 | * | 3/2004 | Vukos et al. .......... 604/385.22 |
| 6,794,024 B1 | | 9/2004 | Waton et al. |
| 7,220,478 B2 | * | 5/2007 | McCormack et al. .......... 428/304.4 |
| 7,226,880 B2 | * | 6/2007 | Potnis .......... 442/398 |
| 2002/0081423 A1 | * | 6/2002 | Heffelfinger .......... 428/297.4 |

* cited by examiner

Primary Examiner—Kevin R. Kruer
(74) Attorney, Agent, or Firm—McAndrews, Held & Malloy, Ltd.

(57) ABSTRACT

The present invention provides a multilayer film preferably comprising two skin layers, each preferably comprising low density polyethylene, two outer core layers, preferably comprising an additive and a styrene block copolymer, and an inner core layer preferably comprising an additive and a styrene block copolymer.

18 Claims, 1 Drawing Sheet

TRANSVERSE-DIRECTION, ELASTOMERIC, BREATHABLE FILM

RELATED APPLICATIONS

This application is a continuation of U.S. application Ser. No. 11/048,408, filed on Feb. 1, 2005, now pending. The disclosure of which is hereby incorporated by reference in its entirety.

BACKGROUND OF THE INVENTION

The present invention relates generally to synthetic films and, more specifically, to a transverse-direction elastomeric film having a microporous, breathable structure. The present film preferably has a five-layer structure having generally the following arrangement: skin/outer core/inner core/outer core/skin.

Plastic films are used in a variety of applications. Such films range from single-layer polymers to multilayer structures with various tie layers and copolymers included therein. The use of multiple layers allows for the custom adaptation of a film to meet certain property requirements, ranging from barrier requirements to strength requirements.

One use of such films is to provide a barrier layer in diapers, absorbent pads, and the like. In uses wherein the product containing the film contacts human skin for a prolonged period of time, such as for example with diapers, the skin of the person being so contacted is likely to develop a rash or other irritation. Conventional films do not adequately address this problem. What is needed, therefore, is a multilayer film adapted to provide the physical properties desired for films used in diapers and the like, while at the same time made breathable in order to reduce or eliminate rashes and other irritation.

BRIEF SUMMARY OF THE INVENTION

In one embodiment of the present invention the multilayer film of the present invention includes a first layer composed of at least one polyolefin polymer. A second layer is also provided, including at least one polymer compound, which may be a polyolefin polymer, an ethylene copolymer resin, a styrene block copolymer, a fluoropolymer, polyvinylchloride, or any other suitable polymer or mixtures thereof.

In one alternative embodiment of the present invention, the second layer of the multilayer film includes a metallocene-catalyzed polymer. In another embodiment of the present invention, the second layer further includes an additive, such as calcium carbonate or other suitable additive.

In a preferred embodiment, the film of the present invention has five layers, including two skin layers preferably comprising low density polyethylene, two outer core layers, preferably comprising and additive and a styrene block copolymer, and an inner core layer, preferably comprising an additive and a styrene block copolymer.

In a preferred embodiment of the invention, the skin layers further include at least one additive, such as an antioxidant or antiblocking agent. Further, the outer core layers preferably include a metallocene-catalyzed polymer such as metallocene-catalyzed linear low density polyethylene. The additive in the inner and outer core layers is preferably calcium carbonate.

DETAILED DESCRIPTION OF THE INVENTION

Figure 1:
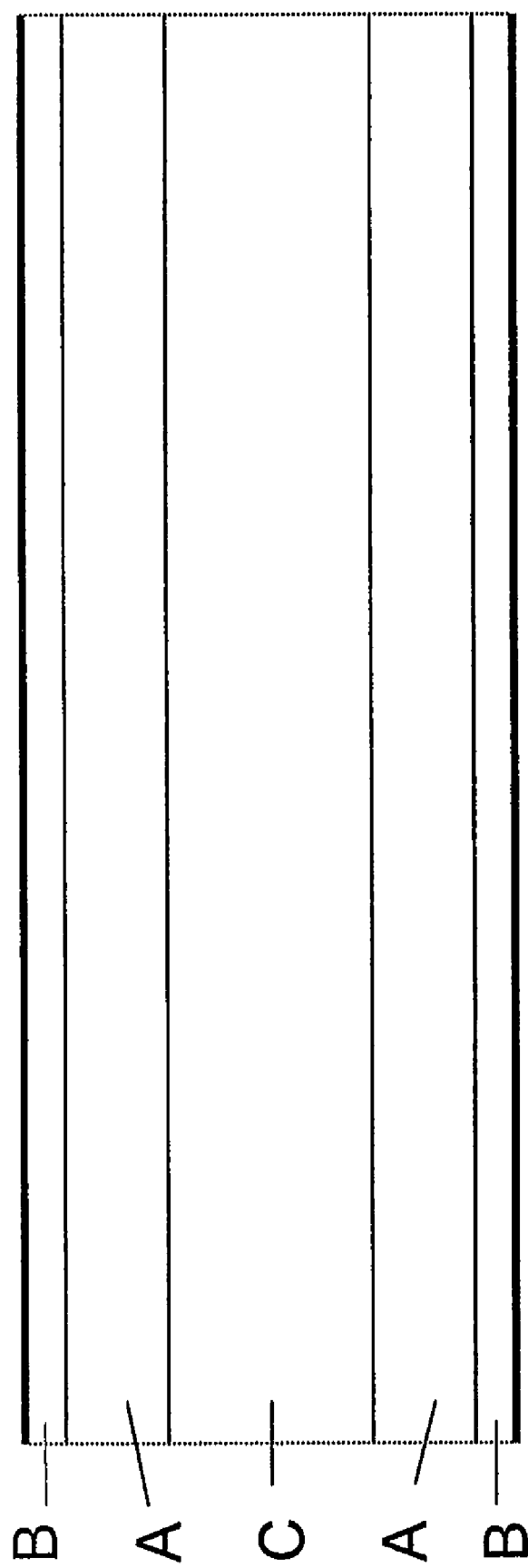
FIG. 1 is a cross-sectional view of a five-layer film constructed in accordance with the teachings of the present invention.

The multilayer film of the present invention has a structure that includes at least one first layer of at least one polyolefin polymer, and at least one second layer which includes at least one compound selected from metallocene-catalyzed polyolefin polymers, ethylene copolymer resins, styrene-ethylene/butylene-styrene block copolymers, and mixtures thereof. The total thickness of the film may vary depending upon the intended application of the film. The preferred film has a thickness of from about 1.25 mils to about 1.5 mils and, more preferably, of about 1.34 mils (about 30 g/m$^2$). The thickness of individual layers is preferably from about 0.025 mils to about 0.75 mils, and more preferably about 0.60 mils.

Turning now to FIG. 1, a preferred embodiment of the present invention has five layers in the following configuration: skin layer/outer core/inner core/outer core/skin layer. In the FIGURE, the skin layers are represented by the letter 'B,' the outer core layers are represented by the letter 'A,' and the inner core layer is represented by the letter 'C.' In this embodiment of the present invention, it is preferred that each skin layer comprise about 1%-2% by weight of the total film, or, preferably about 1%-1.5% by weight of the total film or more preferably, comprise about 1% by weight of the total film. It is also preferred, in this embodiment, that each outer core layer comprise about 18%-24%, by weight, of the total film, or preferably about 20%-24% by weight of the total film, or more preferably about 24% by weight of the total film. Finally, in this embodiment it is preferred that the inner core comprise about 48%-60% by weight of the total film, or preferably about 48%-54% by weight of the total film, or more preferably about 48% by weight of the total film. It will be appreciated by those skilled in the art, however, that the thickness of each individual layer may vary from the preferred thicknesses given above.

The multilayer film of the present invention may be produced by conventional methods used in producing multilayer films, including coextrusion and extrusion lamination techniques. For example, the film may be formed by coextrusion. Using this method, melted and plasticized streams of individual layer materials are fed into a coextrusion die. While in the die, the layers are juxtaposed and combined, after which they emerge from the die in a single multilayer film of polymeric material. Suitable coextrusion techniques are fully described in U.S. Pat. Nos. 5,139,878 and 4,677,017, incorporated herein by reference to the extent permitted by law. Coextrusion of the present film may be conducted at temperatures of from about 400° F. to about 510° F. Coextrusion techniques include the use of a feed block with a standard die, a multi-manifold die, such as a circular die, as well as a multi-manifold die such as used in forming flat cast films and cast sheets. The multilayer films of the present invention may also be made by blown film coextrusion. The film is formed using a blown film apparatus composed of a multi-manifold circular die head having concentric circular orifices. The multilayer film is formed by coextruding a molten layer through a circular die, and a molten layer on the other or each opposite side of the first layer through additional circular dies concentric with the first circular die. Next, a gas, typically air, is blown through a jet that is concentric with the circular dies, thereby forming a bubble that expands the individual layers. The bubble is collapsed onto itself to form a pair of multilayer films attached at two opposite edges. Usually, the pair of attached multilayer films are then cut apart at one or more of the edges and separated into a pair of multilayer films that can be rolled up. It is preferred that the films of the present invention are geared from a flat cast process. An example of the preferred process is provided below.

Example 1

Method of Producing Films of the Present Invention

A preferred method for producing the films of the present invention is now described. As a first step, components are blended at a loss-in-weight blender and combined in the desired proportions (described more fully with respect to specific films, below), then sent to the feed portion of an extruder. This process allows for dry-blending of ingredients, thereby avoiding the need to utilize more expensive, fully compounded blends. Dedicated extruders mix, melt, and meter the components to a specific film layer. A feed block and flow plate channel three melt streams into a five layer configuration. The three melt streams are A) the outer core; B) the skin; and C) the inner core. The five layer configuration of the melt streams is as follows: B-A-C-A-B. A flat, single slot die extrudes the film onto a smooth chill cast roll, producing the flat film product. Next, a series of pre-heat, draw, and annealing rolls provide the film with sufficient machine-direction orientation to induce the formation of micro voids in the structure. These pores allow for water vapor transmission, but are too small to allow passage of liquid. The process of machine-direction orientation also results in minimal forces required for transverse-direction elongation. The choice of elastomeric material helps ensure adequate stretch and recovery, and conformance to stated physical property requirements. Machine-direction relaxation follows, to minimize film shrinkage in subsequent, downstream operations. The film is allowed to retract 10%-25% prior to winding.

In the preferred film, the outer skin layers each comprise about 1%-2% by weight of the total film, and are preferably comprised of at least one polyolefin polymer. Preferred polyolefin polymers include polyethylene, polypropylene, polybutenes, polyisoprenes, copolymers thereof, terpolymers thereof, α-olefin propylene copolymers, and mixtures thereof. Any other suitable polyolefin polymers may be used. Suitable polyethylenes include, in particular, low density polyethylene (LDPE), linear low density polyethylene (LLDPE), and ultra low density polyethylene (ULDPE). Particularly preferred is "barefoot" grade LDPE. Preferred propylene polymers generally have a melting point of 180° C. or above. Preferred propylene polymers further generally have a melt flow index of from about 0.5 g/10 min to about 10 g/10 min at 230° C., and a force of about 21.6N. Isotactic propylene homopolymer having an n-heptane-soluble content of from about 1-15% by weight, copolymers of propylene with $C_4$-$C_8$ α-olefins having an α-olefin content of 10% by weight or less, and terpolymers of propylene, ethylene, and butylene having an ethylene content of 10% by weight or less and a butylene content of 15% by weight or less are preferred propylene polymers. Also suitable is a mixture of propylene homopolymers, copolymers, terpolymers, and other polyolefins. The skin layers serve, among other functions, to protect from die buildup, and to minimize or prevent film blocking or sticking. The skin layers may further include additives such as antioxidants or antiblocking agents.

In the preferred film, the outer core layers each comprise about 18%-24%, and preferably about 24%, by weight of the film as a whole. Each outer core layer preferably comprises about 67% by weight of a neutralizer, such as $CaCO_3$ (preferably provided in the form of a calcium carbonate super concentrate, described below), about 26% by weight of a styrene-ethylene/butylene-styrene (SEBS) polymer, such as, for example, Kraton 1657 available from Kraton Polymers (Houston, Tex.), and about 7% by weight of a metallocene-catalyzed polyolefin polymer, such as, for example, the ethylene α-olefin resin Dow PL 1280, available from Dow Chemical Company (Midland, Mich.). Other suitable elastomers may be used in place of the SEBS polymer described above, such as Kraton 6571 and Kraton 6936. Likewise, other suitable metallocene-catalyzed polymers may be used in place of the metallocene-catalyzed polyolefin polymers described above. The outer core layers serve, among other functions, to provide breathability, some elastomeric performance, durability (with metallocene-catalyzed polymer), and block-resistant qualities.

In the preferred film, the inner core layer comprises approximately 48%-60% by weight of the film. The inner core layer preferably comprises about 67% by weight of a neutralizer such as $CaCO_3$ (preferably provided in the form of a calcium carbonate super concentrate, described below), and about 33% by weight of a high SEBS block copolymer, such as, for example, Kraton G1657. Other suitable compounds, such as styrene-ethylene/butylenes-styrene thermoplastic elastomers, or high performance thermoplastic rubbers may also be used. The inner core serves, among other functions, to provide breathability and elastic performance to the film.

The calcium carbonate additive in the inner and outer core layers of the present invention may be provided in any suitable manner, but is preferably provided in the form of a calcium carbonate super concentrate. This super concentrate preferably contains about 75% Omya 2SST calcium carbonate with stearic acid coating, about 0.18% B-900 antioxidant (available from Ciba Specialty Chemicals, Tarrytown, N.Y.), about 12.41% Dowlex 2517 LLDPE, and about 12.41% Dowlex 2035 LLDPE.

It will be appreciated by those skilled in the art that additives may be added to one or more layers of the film of the present invention in order to improve certain characteristics of the particular layer. Preferred additives include color concentrates, neutralizers, process aids, lubricants, stabilizers, hydrocarbon resins, antistatics, and antiblocking agents. A color concentrate may be added to yield a colored layer, an opaque layer, or a translucent layer. Preferred color concentrates include color formulations, including black, white, and other colors suitable for the film of the present invention. Preferred color concentrates include Ampacet® white PE masterbatch, available from Ampacet Corporation (Tarrytown, N.Y.). The carrier resin of Ampacet® white PE masterbatch is a LLDPE having a melt index of 20 g/10 min and a density of 0.92 g/cc. This concentrate has a nominal specific gravity of 2.06, a melt index of 3-23 g/10 min, and nominally contains 75% ash. Another preferred color concentrate includes Ampacet® white HDPE masterbatch, the carrier resin of which is a HD/LLDPE having a nominal melt index of 10 g/10 min and a density of 0.96 g/cc. This concentrate has a nominal specific gravity of 1.54, a melt index of 9-15 g/10 min, and a pigment composed of 50% $TiO_2$.

Suitable neutralizers include calcium carbonate, as indicated above, and calcium stearate. Preferred neutralizers have an absolute particle size of less than 10 μm and a specific surface area of at least 40 m²/g. Polymeric processing aids may also be used in a layer. Fluoropolymers, fluoropolymer blends, and fluoroelastomers are particularly preferred, but any processing aid known in the art for use in polymer films is suitable. A particularly preferred processing aid is Ampacet® Process Aid PE masterbatch, having an LLDPE carrier resin with a nominal melt index of 2 g/10 min and a density of 0.918 g/cc. The concentrate therein has a nominal specific gravity of 0.91, a nominal melt index of 1-3 g/10 min, and contains 3% ash.

Lubricants that may be used in accordance with the present invention include higher aliphatic acid esters, higher aliphatic acid amides, metal soaps, polydimethylsiloxanes, and waxes. Conventional stabilizing compounds for polymers of ethylene, propylene, and other α-olefins are preferably employed in the present invention. In particular, alkali metal carbonates, alkaline earth metal carbonates, phenolic stabilizers, alkali metal stearates, and alkaline earth metal stearates are preferentially used as stabilizers for the composition of the present invention.

Hydrocarbon resins and, in particular, styrene resins, terpene resins, petroleum resins, and cyclopentadiene resins have been found to be suitable as additives in order to improve desirable physical properties of the film. These properties may include water vapor permeability, shrinkage, film rigidity, and optical properties. In particular, adhesive resins are preferred. A particularly preferred adhesive resin is sold under the trademark Bynel® by DuPont Corporation and is primarily composed of maleic anhydride modified polyolefin with some residual maleic anhydride and may also contain small amounts of stabilizers, additives and pigments.

Preferred antistatics include substantially straight-chain and saturated aliphatic, tertiary amines containing an aliphatic radical having 10-20 carbon atoms that are substituted by ω-hydroxy-($C_1$-$C_4$)-alkyl groups, and N,N-bis-(2-hydroxyethyl)alkylamines having 10-20 carbon atoms in the alkyl group. Other suitable antistatics include ethoxylated or propoxylated polydiorganosiloxanes such as polydialkysiloxanes and polyalkylphenylsiloxanes, and alkali metal alkanesulfonates.

Preferred antiblocking agents include organic polymers such as polyamides, polycarbonates, and polyesters. Other preferred agents include calcium carbonate, aluminum silicate, magnesium silicate, calcium phosphate, silicon dioxide, and diatomaceous earth.

In the preferred embodiments of the film of the present invention described hereinabove, the film structure is a five-layer structure. The five-layer construction allows the highest content of elastomer to be buried inside the inner core layer. This permits other components to function as a protective outer core layers to minimize or prevent layers of film from sticking or blocking by minimizing the content of tacky, sticky elastomer in the outer core, and also permits the use of metallocene-catalyzed polyolefin polymer in outer core layers in order to encapsulate the inner core and provide film toughness. Finally, the five-layer configuration permits the use of a thin, protective LDPE outer skin to provide protection from die build up during the film casting process. Because of these advantages, the five-layer embodiment of the present film described above it preferred. It will, however, be appreciated by those skilled in the art upon reading this disclosure that an alternate number of layers could also be used.

The present invention is further illustrated by the following examples, which are not to be construed in any way as imposing limitations upon the scope thereof. On the contrary, it is to be clearly understood that various other embodiments, modifications, and equivalents which, after reading the description herein, may suggest themselves to those skilled in the art, may be used without departing from the spirit of the present invention and/or the scope of the appended claims.

Examples of Film Structures in Accordance with the Present Invention

A five-layer film having a total thickness of about 1.5 mils was produced using the formula set forth in Table 1.

TABLE 1

Formulation A - 5 Layer Formulation

| Layer | Percent (w) of Film | Polymer | Additive | Metallocene |
|---|---|---|---|---|
| 1 (skin) | 1% | LDPE | 0 | 0 |
| 2 (outer core) | 18% | 23% SEBS | 67% $CaCO_3$ | 7% ethylene α-olefin resin |
| 3 (inner core) | 62% | 33% SEBS | 67% $CaCO_3$ | 0 |
| 4 (outer core) | 18% | 23% SEBS | 67% $CaCO_3$ | 7% ethylene α-olefin resin |
| 5 (skin) | 1% | LDPE | 0 | 0 |

The specific products used in the manufacture of Table 1 film are provided in Table 2, below.

TABLE 2

Formulation B - 5 Layer Formulation

| Layer | Percent (w) of Film | Polymer | Additive | Metallocene |
|---|---|---|---|---|
| 1 (skin) | 1% | LDPE | 0 | 0 |
| 2 (outer core) | 18% | 23% Kraton 1657 | 67% $CaCO_3$ | 7% Dow PL1280 |
| 3 (inner core) | 62% | 33% Kraton G1657 | 67% $CaCO_3$ | 0 |
| 4 (outer core) | 18% | 23% Kraton 1657 | 67% $CaCO_3$ | 7% Dow PL1280 |
| 5 (skin) | 1% | LDPE | 0 | 0 |

The films described in tables 1 and 2 were produced by the following process. The film was produced by a coextrusion method, with LDPE present in the skin layer extruder such that a 1% LDPE skin layer was produced on either side of the film. Casting began at a chill roll speed of about 50 meters/minute (about 150 feet/min), with the chill roll speed being gradually increased to a speed of up to about 75 meters/min (225 f/min). Unstretched film thickness was calculated to be about 3.4 mils. MDO temperature was adjusted to 130° F. in preheat, 125-130° F. in stretch zones, and 170-175° F. in the final two rolls in the MDO in order to anneal the film. A stretch ratio of about 3.85× to about 4× was used to observe film stretching and check film properties. The film was retracted approximately 18% in the MDO.

A five-layer film having a total film thickness of about 1.50 mils was produced using the formula set forth in Table 3.

TABLE 3

Formulation C - 5 Layer Formulation

| Layer | Percent (w) of Film | Polymer | Additive | Metallocene |
|---|---|---|---|---|
| 1 (skin) | 1% | LDPE | 0 | 0 |
| 2 (outer core) | 18% | 23% Kraton 1657 | 67% $CaCO_3$ | 7% Dow PL1280 |

TABLE 3-continued

Formulation C - 5 Layer Formulation

| Layer | Percent (w) of Film | Polymer | Additive | Metallocene |
|---|---|---|---|---|
| 3 (inner core) | 62% | 33% Kraton Blend (20% 1657 + 80% other SEBS thermoplastic elastomer) | 67% CaCO₃ | 0 |
| 4 (outer core) | 18% | 23% Kraton 1657 | 67% CaCO₃ | 7% Dow PL1280 |
| 5 (skin) | 1% | LDPE | 0 | 0 |

A five-layer film having a total film thickness of about 1.5 mils was produced using the formula set forth in Table 4.

TABLE 4

Formulation D - 5 Layer Formulation

| Layer | Percent (w) of Film | Polymer | Additive | Metallocene |
|---|---|---|---|---|
| 1 (skin) | 1% | LDPE | 0 | 0 |
| 2 (outer core) | 18% | 23% Kraton 1657 | 67% CaCO₃ | 7% Dow PL1280 |
| 3 (inner core) | 62% | 33% Kraton Blend (40% 1657 + 60% other SEBS thermoplastic elastomer) | 67% CaCO₃ | 0 |
| 4 (outer core) | 18% | 23% Kraton 1657 | 67% CaCO₃ | 7% Dow PL1280 |
| 5 (skin) | 1% | LDPE | 0 | 0 |

The film was tested for elastic performance and breathability. For elasticity, a two cycle test was used to determine load loss and percent set. The two cycle test was done up to 70% elongation. The sample size was three inches in the machine direction by six inches in the transverse direction. The grip size was three inches in width. The grip separation was four inches. The samples were loaded such that the transverse direction of the sample was in the vertical direction. The preload was of approximately 10-15 grams set. During the test, the film was pulled at 20 inches/min (500 mm/min) to 70 percent elongation (2.8 inches in addition to the 4 inch gap), and then immediately returned to the zero point (the 4 inch gauge separation). The term "percent set" refers to the measure of the amount of the material stretched from its original length after being cycled. Percent set is defined as the point at which the retraction curve crossed the elongation axis. The "load loss" value was calculated as follows:

$$\frac{\text{cycle 1 extension} - \text{cycle 2 tension}}{\text{cycle 1 extension tension}} \times 100\%$$

where the extension tension for both cycles is determined at 50% elongation.

The foregoing description of the embodiments of the invention has been presented for purposes of illustration and description, and is not intended to be exhaustive or to limit the invention to the precise form disclosed. The description was selected to best explain the principles of the invention and practical application of these principles in order to enable others skilled in the art to best utilize the invention in various embodiments and with such modifications as are suited to the particular use contemplated. It is intended that the scope of the invention not be limited by the specification, but be defined by the claims as set forth below.

What is claimed is:

1. A multilayer coextruded film comprising:
   a first skin film layer comprising at least one polyolefin polymer;
   a first outer core layer comprising about 67% by weight of calcium carbonate, about 26% by weight of at least one styrene-based elastomer, and about 7% by weight of a metallocene-catalyzed alpha olefin polymer;
   an inner core layer formed from a calcium carbonate neutralizer and at least one styrene-based film-forming elastomer, the inner core layer being free of metallocene-catalyzed polymer;
   a second outer core layer comprising about 67% by weight of calcium carbonate, about 26% by weight of at least one styrene-based elastomer, and about 7% by weight of a metallocene-catalyzed alpha olefin polymer; and
   a second skin layer comprising at least one polyolefin polymer,
   wherein said inner core layer is situated between said first and second outer core layers and has a composition that differs from said first and second outer core layers, and wherein said first and second outer core layers are situated between said first and second skin film layers;
   wherein the inner core layer comprises a higher content of elastomer than either of the first or second outer core layers; and
   wherein the film is elastomeric and breathable.

2. The multilayer film of claim 1 wherein the at least one polyolefin polymer in said first and second skin layers includes low density polyethylene.

3. The multilayer film of claim 1 wherein said first and second skin layers comprise from about 2% to about 4% by weight of said film.

4. The multilayer film of claim 1 wherein said first and second outer core layers comprise from about 36% to about 48% by weight of said film.

5. The multilayer film of claim 1 wherein said inner core layer comprises from about 48% to about 60% by weight of said film.

6. The multilayer film of claim 1 wherein said first and second skin layers further comprise at least one additive selected from the group consisting of antioxidants and antiblocking agents.

7. A multilayer coextruded film comprising:
   a first skin layer comprising low density polyethylene;
   a first outer core layer comprising about 67% by weight of calcium carbonate, about 26% by weight of styrene-ethylene/butylene-styrene elastomer and about 7% by weight of a metallocene-catalyzed linear low-density polyethylene;
   an inner core layer consisting of calcium carbonate and styrene-ethylene/butylene-styrene elastomer, wherein the inner core is free of metallocene-catalyzed polyolefin polymer;
   a second outer core layer comprising about 67% by weight of calcium carbonate, about 26% by weight of styrene-ethylene/butylene-styrene elastomer and about 7% by weight of a metallocene-catalyzed linear low-density polyethylene; and
   a second skin layer comprising low density polyethylene, wherein the multilayer film is formed by coextruding each of the skin layers, the outer core layers and the inner core layer together into a single multilayer film;

wherein said inner core layer is situated between said first and second outer core layers and has a composition that differs from said first and second outer core layers, and wherein said first and second outer core layers are situated between said first and second skin layers; and wherein the multilayer film is elastomeric and breathable.

8. The multilayer film of claim 7 wherein said first and second skin layers further include at least one additive selected from the group consisting of antioxidants and antiblocking agents.

9. The multilayer film of claim 7 wherein said first and second skin layers each comprise from about 1% to about 2%, by weight, of said film, said first and second outer core layers each comprise from about 18% to about 24%, by weight, of said film, and said inner core layer comprises from about 48% to about 60%, by weight, of said film.

10. The multilayer film of claim 7 wherein said styrene-ethylene/butylene-styrene elastomer in said inner core layer comprises a triblock copolymer.

11. The multilayer film of claim 7 wherein said styrene-ethylene/butylene-styrene elastomer in said first and second outer core layers comprises a triblock copolymer.

12. The multilayer film of claim 7 wherein the inner core layer comprises a higher content of elastomer than either of the first or second outer core layers.

13. A coextruded multilayer film comprising:

a first skin film layer comprising low density polyethylene;

a first outer core layer comprising about 67% by weight of a neutralizer, about 26% by weight of styrene-ethylene/butylene-styrene elastomer, and about 7% by weight of a metallocene-catalyzed polyolefin polymer;

an inner core layer formed from a neutralizer and at least one styrene-ethylene/butylene-styrene film-forming elastomer;

a second outer core layer comprising about 67% by weight of a neutralizer, about 26% by weight of styrene-ethylene/butylene-styrene elastomer, and about 7% by weight of a metallocene-catalyzed polyolefin polymer; and a second skin film layer comprising low density polyethylene, wherein the multilayer film is formed by coextruding each of the skin layers, the outer core layers and the inner core layer together into a single multilayer film;

wherein said inner core layer is situated between said first and second outer core layers and has a composition that differs from said first and second outer core layers;

wherein said first and second outer core layers are situated between said first and second skin film layers;

wherein the inner core layer comprises a higher content of elastomer than either of the first or second outer core layers; and wherein the multilayer film is elastomeric and breathable.

14. The multilayer film of claim 13 wherein the neutralizer in said inner core layer and said first and second outer core layers comprises calcium carbonate.

15. The multilayer film of claim 13 wherein the inner core is free of metallocene-catalyzed polyolefin polymer.

16. The multilayer film of claim 13 wherein said first and second skin layers each comprise from about 1% to about 2% by weight, of said film, said first and second outer core layers each comprise from about 18% to about 24%, by weight, of said film, and said outer core layer comprises from about 48% to about 60%, by weight, of said film.

17. The multilayer film of claim 13 wherein said styrene-ethylene/butylene-styrene elastomer in said inner core layer comprises a triblock copolymer.

18. The multilayer film of claim 13 wherein said styrene-ethylene/butylene-styrene elastomer in said first and second outer core layers comprises a triblock copolymer.

* * * * *